United States Patent [19]

Maxwell

[11] Patent Number: 5,082,035
[45] Date of Patent: Jan. 21, 1992

[54] OIL COLLECTING AND DISPENSING APPARATUS

[76] Inventor: Boyce A. Maxwell, 10527 Kirkvale Dr., Houston, Tex. 77089

[21] Appl. No.: 649,235

[22] Filed: Jan. 29, 1991

Related U.S. Application Data

[63] Continuation of Ser. No. 464,425, Jan. 12, 1990, abandoned.

[51] Int. Cl.$^5$ .............................................. F16N 31/00
[52] U.S. Cl. ...................................... 141/98; 141/338; 141/331; 184/106; 220/573; 222/534
[58] Field of Search .................. 141/98, 114, 86–88, 141/331–334, 337–343; 184/1.5, 106; 220/571, 573; 222/534, 533, 538

[56] References Cited

U.S. PATENT DOCUMENTS

| | | | |
|---|---|---|---|
| Re. 27,449 | 8/1972 | Bartz | 220/1 C |
| Re. 32,458 | 7/1987 | DeLay, jr. | 220/1 C |
| 521,113 | 6/1894 | Hart | 222/534 X |
| 1,056,855 | 3/1913 | Tamagno | 222/534 |
| 2,800,259 | 7/1957 | Wilson et al. | 222/534 |
| 3,410,438 | 11/1968 | Bartz | 220/573 |
| 4,010,863 | 3/1977 | Ebel | 220/573 |
| 4,098,398 | 7/1978 | Meyers | 206/223 |
| 4,114,644 | 9/1978 | Piper | 137/565 |
| 4,274,645 | 6/1981 | Ferguson et al. | 184/106 |
| 4,286,634 | 9/1981 | Wisner | 141/98 X |
| 4,296,838 | 10/1981 | Cohen | 184/106 |
| 4,301,841 | 11/1981 | Sandow | 141/98 |
| 4,314,654 | 2/1982 | Gaubert | 222/536 |
| 4,355,737 | 10/1982 | Pongrass et al. | 222/536 |
| 4,403,692 | 9/1983 | Pollacco | 206/223 |
| 4,488,584 | 12/1984 | Hestehave et al. | 141/331 |
| 4,533,042 | 8/1985 | Pollacco | 220/1 C |
| 4,557,395 | 12/1985 | Delay, Jr. | 220/1 C |
| 4,632,268 | 12/1986 | Melzi et al. | 220/1 C |
| 4,640,431 | 2/1987 | Harrison | 220/1 C |
| 4,673,081 | 6/1987 | Habig et al. | 206/223 |
| 4,697,670 | 10/1987 | Arruda | 184/1.5 |
| 4,702,290 | 10/1987 | Perez | 141/332 |
| 4,706,719 | 11/1987 | Eversdijk | 141/98 |
| 4,756,411 | 7/1988 | Garland | 206/223 |
| 4,856,568 | 8/1989 | Murphy et al. | 141/337 |
| 4,881,650 | 11/1989 | Bartz | 220/573 |

FOREIGN PATENT DOCUMENTS 8105429  7/1983  Netherlands ................. 220/1 C

*Primary Examiner*—Henry J. Recla
*Assistant Examiner*—C. Jacyna
*Attorney, Agent, or Firm*—Vaden, Eickenroht, Thompson & Boulware

[57] ABSTRACT

Apparatus for quick, clean and convenient changing of the oil or other fluids of a vehicle of particular use to the "do-it-yourselfer." The apparatus is sized so as to fit under most vehicles when resting on one side thereof and is provided with an extensible snorkel having a funnel mounted on the end thereof for collecting the fluid that is mounted in a recess in one side thereof so as not to catch on the undercarriage of the vehicle when slid under or out from under the vehicle. Once positioned, the funnel is raised into close approximation with the oil drain plug, oil filter neck, or other location from which fluid is to be collected, and the fluid is drained into the funnel and directed down through the snorkel into the container. The container is then stood upright for dispensing the stored oil through a valve, which is also recessed in the container, into a larger recycling or other collection facility.

10 Claims, 2 Drawing Sheets

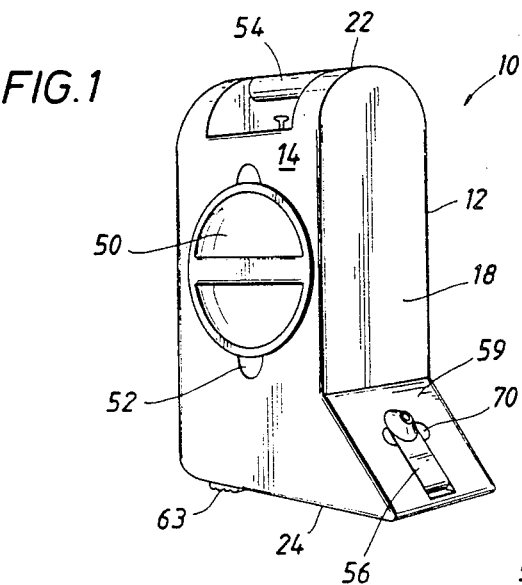
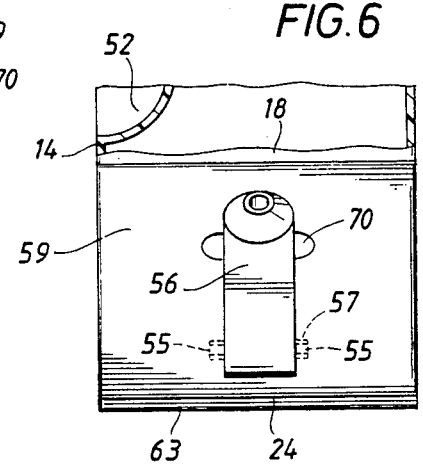
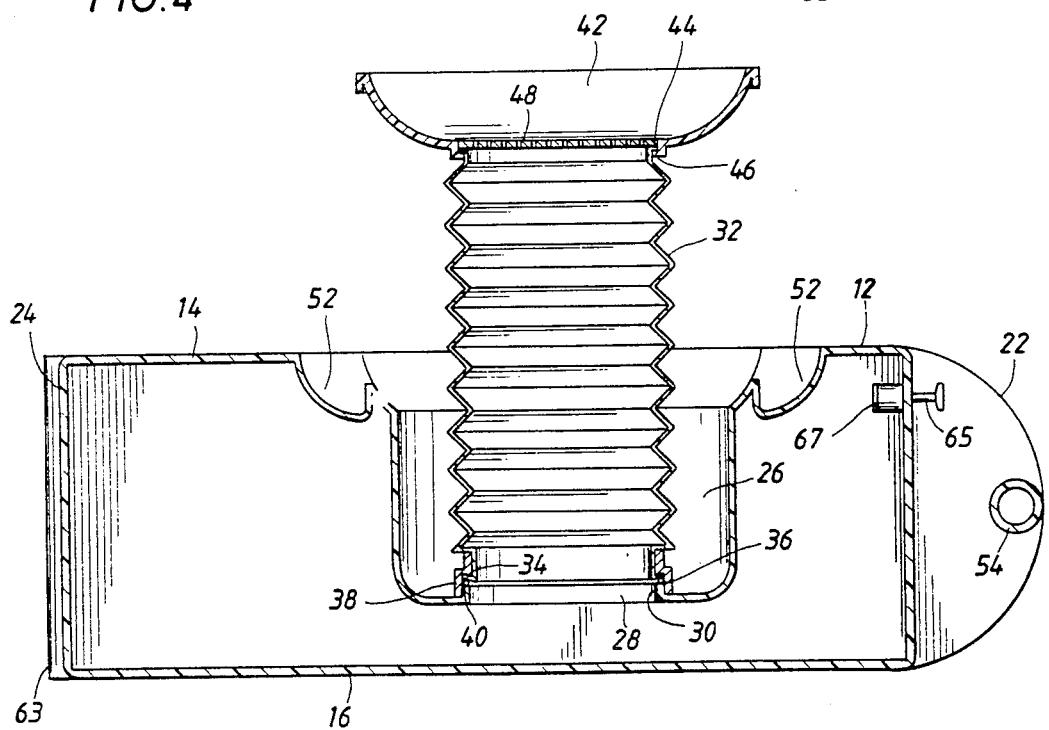

OIL COLLECTING AND DISPENSING APPARATUS

This application is a continuation of co-pending application Ser. No. 07/464,425, filed on Jan. 12, 1990 now abandoned.

BACKGROUND OF THE INVENTION

The present invention relates to an apparatus for collecting used motor oil, storing, and then for dispensing that motor oil at a later date. In more detail, the present invention relates to a container having an integral telescoping snorkel with a funnel mounted on the end thereof for collecting motor oil drained from an internal combustion engine which is used for storing the used oil until the oil can be taken to a recycling point.

The reasons for making this invention have been recognized previously, and reference is made to U.S. Pat. No. 4,533,042 wherein the following, somewhat colorful, discussion characterizes the problems associated with the changing of the motor oil from, for instance, an automobile:

"As costs associated with operating and maintaining an automobile have risen, and as many former neighborhood gas stations have closed or converted to 'gas-and-go' stations which do not offer automobile servicing, more motorists have experimented with, or have switched over to, changing their own automotive motor oil."

"One undesirable consequence of this trend is the loss of a considerable amount of reuseable oil from the petroleum refining and distribution system. Generally, when a car's oil is changed at a service station, the waste oil is saved at the station, from which it is periodically collected by the service station's supplier of new oil, or by an independent reprocessor. The collected waste oil is then re-refined into a useable product. Whereas many service stations have, as a convenience, or under direction by suppliers or governmental authority, established facilities to receive waste oil that is brought to the station by 'do-it-yourselfers' (hereinafter "DIY's"), these facilities have largely proved to be inconvenient both to the DIY's and to the dealers and much waste oil never makes it back from the DIY's to these facilities. Rather, it is sewered or run out on the ground, or disposed-of in municipal waste, i.e., put out in an unsegregated manner with the trash for collection and disposition at a landfill. In many urbanized areas, casually discarded, used motor oil has become a pollution menace, and the subject of uncharacteristic criminal behavior by otherwise moral and upstanding citizenry."

"One problem DIY's have with doing their part in recycling waste oil is that many automobiles hold five to seven quarts of oil, whereas most empty containers DIY's are likely to have readily available are four-quart containers. It only takes one time of seeing the last quart of draining dirty oil brim over the container and spill on the garage floor, street or ground to convince a novice DIY that he or she is incompetent to change the oil again, and is one reason why the oil is dumped illegally."

"Another problem DIY's have with such a project is that most conveniently available closeable containers that have a large enough capacity to hold all five to seven quarts of oil are too tall to fit under the car at the location from which oil is to be drained from the crankcase. Some DIY's decide upon discovering this problem to abandon the project and take the car to a service station, others move the car to a place (such as over a storm drain) where they can let the waste oil drain out without being collected. A particularly enterprising segment of DIY's devise a multi-step operation in which they first drain the waste oil from the crankcase into a low-sided, broad container such as a dishpan, and then pour it from the dishpan or the like into a jug that is too tall to have fit under the car in the first place, but which has the virtue of being closeable. Some DIY's make the same mistake at this stage as was mentioned earlier: trying to pour five to seven quarts of oil into a four-quart container. Others cause spillage when they attempt this transfer without the aid of a funnel, or with an inadequate funnel. Besides the mess, this method can prove to be expensive, as when the DIY discards an expensive polyethylene dishpan after a single use because it has gotten too messy and did not work well for this purpose, and is another reason why the oil is dumped illegally."

"A further problem is that some collecting stations will only permit the deposit of used oil in approved containers, or will only permit the DIY's to deposit used oil by pouring from the brought-in containers, with the understanding that the emptied containers themselves may not be left at the station but must immediately be taken back by the DIY's who brought them."

In spite of this the explicit explanation of the problems involved in changing the oil, the device described in that patent has not proved to be the answer such that there is still a need for a device which can solve the problems which are characterized in that patent. One particularly vexing problem, as noted in that patent, has been the problem of the size of the opening into the collector container and the distance between the opening into the container and the crankcase or other location on the vehicle from which oil is to be collected. So far as is known, this problem has only been addressed in U.S. Pat. No. 4,557,395 (and Reissue U.S. Pat. No. RE 32,458), which provides an elongate extension member having a flexible medial portion between the funnel and the container for positioning the funnel in close approximation with the point from which oil is to be collected. However, the extension member is not extensible, or telescoping, to allow adjustment of the height of the funnel, nor is there provision made on that device for storage of that elongate extension member in a manner which is conducive to its ready availability and easy use. The object of the present invention is, therefore, to provide an apparatus which not only addresses the problems characterized so explicitly in U.S. Pat. No. 4,533,042, but which also remedies the deficiencies of the device disclosed in U.S. Pat. No. 4,557,395. Other objects, and the advantages, of the present invention will be made clear to those skilled in the art by the following disclosure.

SUMMARY OF THE INVENTION

This object is achieved by providing an apparatus for use in collecting, storing, and dispensing used motor oil comprising a container having a generally rectangular shape with first and second sides, a top, and a bottom having a recess formed in the first side thereof. A telescoping snorkel which opens into the container is mounted in the recess and a funnel is mounted on the end of the snorkel. The funnel is selectively positionable in a first, stored position in said recess when the container rests on the second side thereof for positioning under the vehicle from which motor oil is to be collected and a second position in which the snorkel is extended to position the funnel in close approximation with the location from which oil is to be collected from the vehicle, the motor oil caught by the funnel being directed down through the snorkel into the container. A drain spout is pivotally mounted in a recess in the wall of the container near the bottom thereof for pivoting between a first, stored position for preventing the draining of oil from the container and in which the spout does not protrude from the surface of the wall of the container and a second, open position in which the interior of the spout is continuous with the interior of the container for dispensing the oil out of the container.

BRIEF DESCRIPTION OF THE DRAWINGS

FIG. 1 is a perspective view of a presently preferred embodiment of an oil collecting and dispensing apparatus constructed in accordance with the teachings of the present invention.

FIG. 4 is a sectional view of the apparatus of FIG. 1 showing the apparatus in use for collecting used motor oil.

FIG. 6 is an enlarged front view, similar to FIG. 2, of a portion of an alternative embodiment of an apparatus constructed in accordance with the teachings of the present invention.

DETAILED DESCRIPTION OF THE PREFERRED EMBODIMENT

Figure 3:
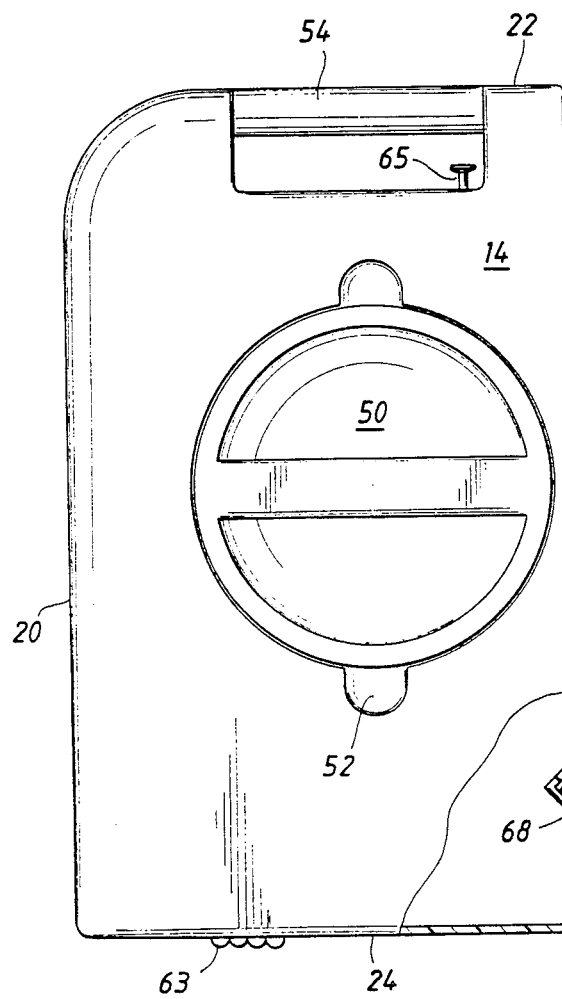
FIG. 3 is a side view of the apparatus of FIG. 1 having a portion thereof shown in cutaway, sectional view to show the details thereof.

A preferred embodiment of the apparatus of the present invention is indicated generally at reference numeral 10 and is comprised of a container 12 having other structure either formed integrally therewith or mounted thereto. Container 12 is generally rectangularly shaped with first and second sides 14 and 16, respectively, a front 18, back 20, top 22 and bottom 24. A recess 26 is formed in the first side 14 of container 12, the bottom of which is provided with a hole 28 formed by a lip 30 (see FIGS. 2 and 4). A telescoping, or extensible, snorkel 32 is mounted at the proximal end thereof to the lip 30 and retained thereto by the bearing of the shoulder 34 formed in snorkel 32 against the shoulder 36 formed in the collar 38 which is integral with lip 30. An O-ring 40 provides a tight seal between shoulder 34 and lip 30.

Figure 2:
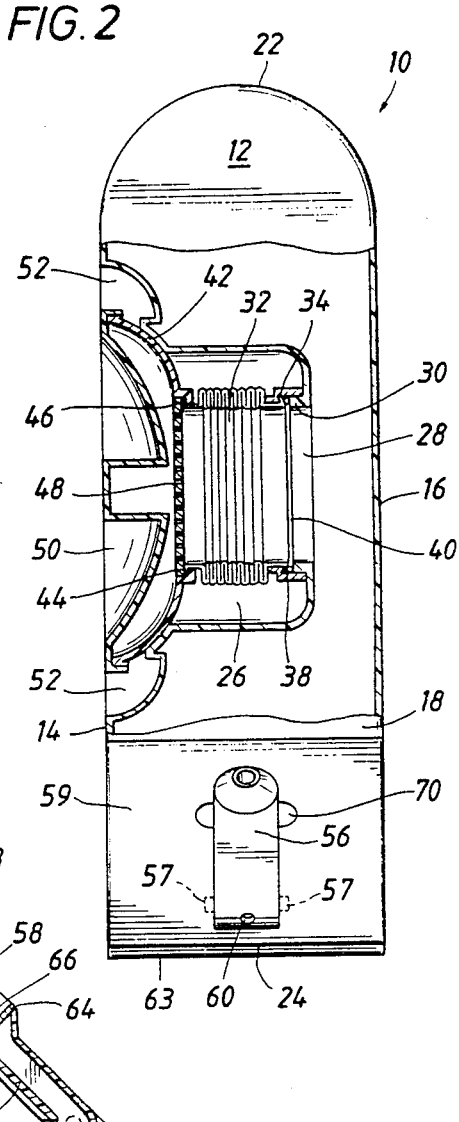
FIG. 2 is a front view of the apparatus of FIG. 1 having a portion thereof shown in cutaway, sectional view to show the details thereof.

A funnel 42 is mounted to the distal end of snorkel 32, the integral shoulder 44 of snorkel 32 interacting with the shoulder 46 formed in funnel 42 to retain funnel 42 thereon. Funnel 42 is provided with a grate, or strainer, 48 to allow passage of oil but prevent the loss of an oil drain plug or other hardware down into container 12. A cap 50 is provided for closing the top of funnel 42 to prevent any residual oil which may coat the inside surface of funnel 42 from running out of funnel 42 when container 12 is stood in the upright position, e.g., when resting on bottom 24 as shown in FIGS. 1 and 3-5. When funnel 42 and snorkel 32 are in their first, stored position, cap 50 is preferably slightly below the surface of container 12 on first side 14 to prevent cap 50 from being inadvertently stripped or knocked off of the funnel 42. Alternatively, cap 50 is sized to fit down into funnel 42 rather than over the outside thereof as shown in FIG. 2.

Recess 26 is provided with finger holes 52 forming a part thereof to facilitate grasping of funnel 42 for selectively positioning funnel 42 in a first, stored position down in recess 26 (FIG. 2) to a second position in which snorkel 32 is extended (FIG. 4) to position funnel 32 in close approximation with the location from which used motor oil is to be collected for draining the oil from the vehicle, the motor oil caught by funnel 42 being directed down through snorkel 32 into container 12. Recess 26 therefore serves as a means for storing snorkel 32 and funnel 42 within the external confines of container 12, and because container 12 is sized to fit under most vehicles when resting on the second side 16 thereof, storing funnel 42 and snorkel 32 in that manner facilitates the positioning of the apparatus 10 under the vehicle. Coincidentally, the storing of the snorkel 32 and funnel 42 in that first position provides the first side 14 of container 12 with an obstruction-free surface providing ease of storage of the apparatus 10 between uses. Once positioned under the vehicle from which used motor oil is to be collected, snorkel 32 and funnel 42 are extended and/or bent until funnel 42 is positioned close to the crankcase drain plug, oil filter neck, or other location from which oil is to be collected so that the distance between the opening into container 12 is effectively reduced to insure that the oil is collected by funnel 42 and directed into container 12.

Once the used motor oil has been drained into container 12 through funnel 42 and snorkel 32, funnel 42 and snorkel 32 are returned to their first position and funnel 42 is closed with cap 50. The oil can then be taken to a recycling and/or collecting station, the handle 54 formed in the top 22 of container 12 providing convenient means for carrying the apparatus 10 when stood upright, e.g., when resting on the bottom 24 thereof. It is noted, however, that container 12 can be formed in sizes with capacities of over twelve quarts, plenty of capacity for the oil changes in most passenger vehicles, while still being small enough in external dimensions to allow the apparatus 10 to be positioned under all but the lowest sprung vehicles while resting on second side 16. Container 12 therefore also serves as a convenient storage container for used motor oil.

To dispense the used oil stored in container 12, a drain spout 56 is pivotally mounted in a recess 58 in the wall of container 12 near the bottom 24 thereof. Drain spout 56 pivots between a first stored position for preventing the draining of oil from container 12 in which the spout 56 does not protrude from the surface of the front wall 18 of container 12 to a second, open position in which the interior of spout 56 is continuous with the interior of container 12 through the mating of the two holes 60 and 62 in drain spout 56 and container 12, respectively, for draining the oil therefrom. Alternatively, oil contained within container 12 flows through holes 55 in the pivot pins 57 on which drain spout 56 is mounted in recess 58 (see FIG. 6). Paired recesses 70 facilitate the grasping of spout 56 so that spout 56 is easily pivoted from the first stored position to the second, open position.

Figure 5:
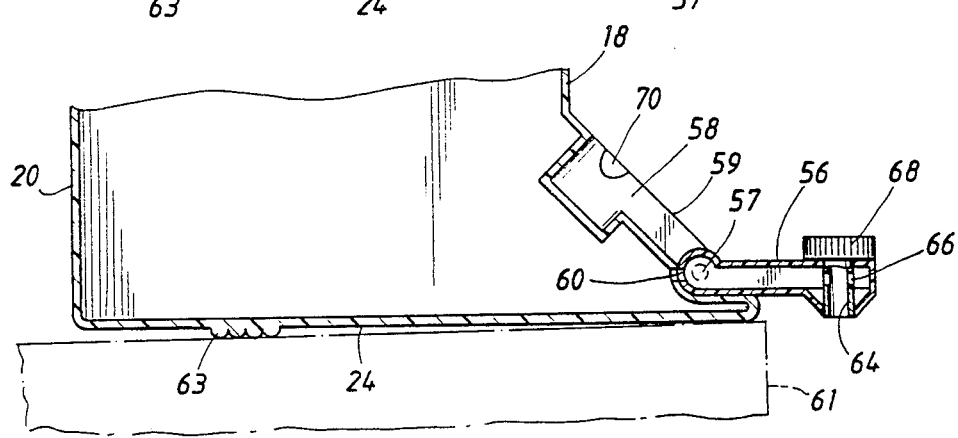
FIG. 5 is a partial sectional view of the apparatus of FIG. 1 showing the apparatus in use for dispensing used motor oil therefrom.

As shown in FIG. 5, container 12 is "stood up" by resting container 12 on the bottom 24 thereof for dispensing the oil collected therein. The bottom 24 of container 12 is provided with a protrusion, or leg, 63 for tipping the erect container 12 toward drain spout 56 to cause oil collected therein to flow downhill toward spout 56 to facilitate the dispensing of oil therefrom when container 12 rests on a surface 61. A vent plug 65 is disposed in a bore 67 located near the top 22 of container 12, e.g., within the recess around handle 54 so as not to protrude from the surfaces of container 12, to further facilitate the dispensing of oil from container 12.

To prevent the leaking of oil from container 12 and to provide for the starting and stopping of the flow of oil out of container 12, spout 56 is provided with an internal sleeve 64 having opposed holes 66 therein which is disposed in a bore (not numbered) in spout 56. Sleeve 64 is provided with an integral knurled knob 68 which facilitates rotation of sleeve 64 to open the interior of sleeve 64 to the interior of spout 56 to allow passage of oil therethrough. To prevent the mess resulting from the leaking of any used oil coating the interior surfaces of spout 56, spout 56 is pivoted upwardly (when container 12 stands in the upright position on the bottom 24 thereof) into recess 58 and recess 58 is positioned in an angled portion 59 of the front 18 of container 12. Positioning recess 58 in the angled portion 59 near the bottom of container 12 tips spout 56 to cause any oil in spout 56 to pool in spout 56 when container 12 rests on the bottom 24 thereof and spout 56 is pivoted to the first stored position, thereby preventing any leakage of that oil.

Construction of the apparatus 10 of the present invention in this manner confers upon that apparatus the number of advantages which have been alluded to in the preceding paragraphs but which may be summarized as follows. First, the construction of apparatus 10 in this manner makes the external dimensions of container 12 such that container 12 will slide beneath all but the lowest-sprung automobiles but still have sufficient capacity for multiple oil changes or for use of the apparatus 10 in changing the oil of light trucks or other utility vehicles. Second, because none of the funnel 42, snorkel 32, or drain spout 56 protrude from the surfaces of container 12 when in their respective stored positions, and because neither handle 54 or vent plug 65 protrude from those surfaces, apparatus 10 is easily stored by the user and packaged and shipped by the manufacturer. Likewise, the construction of the apparatus 10 in this manner virtually eliminates the possibility of interference of one of those structures with a vehicle when placed on second side 16 for sliding the apparatus 10 underneath the vehicle. Third, once positioned under the vehicle, funnel 42 is raised on snorkel 32 into close approximation with an oil drain plug to insure that oil will drain into funnel 32 and not all over the user's hands, the floor or ground, or the outside surface of container 12. Also, once all the oil is drained from the crankcase, the funnel 42 is extended into close approximation with the oil filter neck for removal of the oil filter, the flexible snorkel 32, making it possible to re-position funnel 42 for removing the filter without moving container 12. The ability to re-position funnel 42 without moving container 12 is a significant advantage because the several quarts of oil which may be contained in container 12 can be fairly heavy, and the leverage available for moving the container 12 when positioned at arms' length under a vehicle is minimal. A fourth advantage to the apparatus 10 is the construction which prevents the messy leaking of the oil coating the surfaces of the funnel 42 and/or spout 56 by use of cap 50 and the tipped, pivoted second position of spout 56, respectively. A fifth advantage of the apparatus 10 is the solution of the problem with the device described in the above-referenced U.S. Pat. No. 4,533,042, namely, storage of the member on which the funnel is mounted and which enables the funnel to be closely approximated with the location from which oil is to be collected, by retracting funnel 42 into recess 26. Other advantages will be apparent to those skilled in the art who have the benefit of this disclosure.

Although the apparatus 10 has been described in terms of a presently preferred embodiment thereof, those skilled in the art who have benefit of the instruction set out herein will recognize that certain changes can be made to that preferred embodiment without altering the function or result of the various elements thereof. By way of example, reference has been made throughout the present specification and claims to the collecting and storing of used motor oil. However, the apparatus 10 is also used for collecting and storage of other fluids from sources other than internal combustion engines, and by the use of the word "oil", or the phrase "used motor oil", it is not the intention to be so restricted. A good example is the use of the apparatus 10 for collecting hydraulic fluid from heavy machinery or brake or transmission fluid. Reference is made to used motor oil because that is the presently preferred use of the invention and because the Patent Statute requires that an invention be described in terms of a "best mode contemplated by the inventor." Another example of such a change is that drain spout 56 need not be positioned in a recess such as the recess 58 which is located in the angled portion 59 of the front 18 of container 12 near the bottom 24 thereof, or for that matter, even be pivotally mounted in such a recess. Similar results can be achieved by locating a stopcock-type valve (not shown), such as the valve formed by the sleeve 64 in spout 56, in a recess formed in the bottom 24 of container 12. Such a construction still allows the draining of container 12 by standing the container 12 upright on bottom 24 while positioning a portion of the bottom 24 of container 12 over the edge of the surface such as the surface 61 and then opening the valve to dispense the oil into another container for recycling. The preferred embodiment shown in FIGS. 1-5 has certain advantages over a structure modified in that fashion (for instance, oil is less likely to drain onto the fingers of the person opening the valve, oil coating the inside surfaces of the valve does not leak when the valve is closed, and the positioning of such a modified container 12 over the edge of a surface 62 for draining makes such a modified structure more likely to be knocked off the surface), but that modified structure would function in an equivalent manner to accomplish an equivalent result, and is intended, like all other such modifications, to fall within the spirit and scope of the following claims.

What is claimed is:

1. An apparatus for collecting oil from a vehicle comprising:
   a container having a generally rectangular shape, the walls of said container forming first and second sides, a top, and a bottom, and having a recess formed in the first side thereof with an opening therethrough leading into the container;
   a telescoping snorkel having opposite ends with one end mounted to the opening formed in the first side of said container;
   a funnel forming an inlet opening mounted on the other end of said snorkel;

a cap for closing the inlet opening formed by said funnel, said funnel being selectively positionable in a first, stored position in which said cap, said funnel and said snorkel are positioned down in the recess in the first side of said container within the external confines of said container for facilitating the positioning of said container under a vehicle when said container rests on the second side thereof and a second position in which said snorkel is extended for supporting said funnel in a position in close approximation with the location from which oil is to be collected for draining the oil from the vehicle into said funnel and down through said snorkel into said container; and a drain spout having a valve therein for selectively dispensing the oil collected in said container when said container is stood upright on the bottom thereof.

2. The apparatus of claim 1 wherein said drain spout of pivotally mounted within a recess formed in the walls of said container for pivoting between a first, stored position in which said drain spout does not protrude from the surface of said container for preventing the dispensing of oil therefrom, and a second, open position in which said drain spout extends out of the recess formed in the walls of said container and the interior of said drain spout is continuous with the interior of said container for dispensing used oil from said container.

3. The apparatus of claim 2 additionally comprising a valve for opening and closing said drain spout when said drain spout is in said second, open position.

4. The apparatus of claim 2 additionally comprising a vent for facilitating the dispensing of oil from said container when said container rests on the bottom thereof.

5. The apparatus of claim 2 wherein the recess formed in the walls of said container in which said drain spout is mounted is positioned near the bottom of said container.

6. The apparatus of claim 5 wherein the bottom of said container is provided with a leg for tipping said container toward the recess formed in the walls of said container in which said drain spout is mounted when said container is stood upright to facilitate the draining of oil therefrom.

7. The apparatus of claim 1 wherein said container is provided with a vent for facilitating the dispensing of oil therefrom.

8. The apparatus of claim 1 wherein said snorkel is also flexible.

9. The apparatus of claim 1 wherein the external dimensions of said container are such that said container is capable of fitting under a vehicle when resting on the second side thereof and when said funnel is in said first, stored position.

10. The apparatus of claim 9 additionally comprising a handle for carrying said container when resting on the bottom thereof.

* * * * *